UNITED STATES PATENT OFFICE 2,675,402

TERTIARY CYCLOALIPHATIC HYPOHALITES

Bruce E. Englund, Marshallton, Del., assignor to E. I. du Pont de Nemours and Company, Wilmington, Del., a corporation of Delaware No Drawing. Application July 30, 1951,
Serial No. 239,403

9 Claims. (Cl. 260—453)

This invention relates to a new class of organic hypohalites and to a process for effecting a novel rearrangement reaction thereof.

Certain organic hypohalites, particularly the hypochlorites, are known. These known hypochlorites include tertiary hypochlorites in which the tertiary carbon is singly bonded to three organic radicals, usually hydrocarbon, with the fourth valence of the tertiary carbon being satisfied by the hypochlorite radical. These known tertiary hypochlorites undergo ready degradation, in some instances spontaneously, to form an alkyl halide and a ketone as illustrated below for tertiary amyl hypochlorite which decomposes to acetone and ethyl chloride:

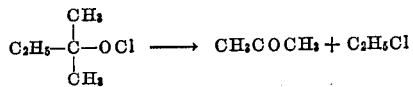

As can be seen, this degradation reaction involves the loss of one of the organic radicals bonded to the tertiary carbon from the main structure of the molecule with the formation of a molecule of an organic chloride. This loss is obviously undesirable in that it represents a high weight loss and allows the production of only lower molecular weight products than the starting materials.

It is an object of this invention to provide a new class of tertiary organic hypohalites. A further object is to provide a new class of tertiary organic hypohalites which do not undergo cleavage but rearrange to a product having the same molecular weight as the starting hypohalite. Another object is to provide a novel method of preparing omega-haloketones. Other objects will appear hereinafter.

These and other objects of this invention are accomplished by providing a new class of tertiary hypohalites, the tertiary cycloaliphatic hypohalites, and a proces for effecting their rearrangement to omega-haloketones.

In the new class of tertiary hypohalites which have now been discovered, at least two and preferably only two of the valences of each tertiary carbon atom which is bonded directly to a hypohalite radical are together joined through at least one divalent organic radical of from 3 to 7 aliphatic chain members, preferably solely carbon, to form at least one and preferably only one aliphatic ring, any remaining valence of said tertiary carbon atom being satisfied by an organic radical, preferably solely hydrocarbon, which is free of Zerewitinoff-active hydrogen. These new tertiary hypohalites are cyclic tertiary hypohalites in which a tertiary carbon atom, which also carries the hypohalite radical, is an annular member of at least one and preferably only one organic ring, said rings containing 4 to 8 aliphatic ring members and being preferably saturated alicyclic, with the remaining valence, if any, of said carbon being satisfied by an organic radical, preferably solely hydrocarbon such as alkyl or aryl, which is free of Zerewitinoff-active hydrogen.

These new cyclic tertiary hypohalites can be schematically represented by the following general structural formula:

wherein X is halogen, preferably of atomic weight greater than 35 and less than 115 (i. e., chlorine and bromine), R is an organic radical of not more than 6 chain members per tertiary hypohalite group in the molecule and preferably solely hydrocarbon of 1 to 6 carbons, free of Zerewitinoff-active hydrogen and which can be together cyclically joined with the ring

and R' is a divalent organic radical of 3 to 7 aliphatic chain members and can include hetero atoms such as oxygen, nitrogen, or sulfur as well as carbon atoms.

These new cyclic tertiary hypohalites are characterized by a new and unexpected behaviour in that they do not decompose under chemical activation but undergo a true rearrangement wherein no molecule is split off, i. e., the rearranged product is of the same molecular weight as the starting hypohalite. These new tertiary cycloaliphatic hypohalites undergo rearrangement to omega-haloketones upon chemical activation as by heating or through the use of catalysts, such as by irradiation with ultraviolet light or sunlight. The omega-haloketones have the same molecular weight as the tertiary cycloaliphatic hypohalites from which they are prepared. This rearrangement may be schematically represented by the following general equation:

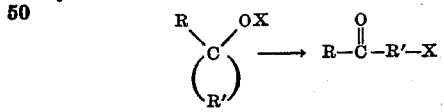

wherein R, R', and X are as described above. This new rearrangement is claimed in my copending continuation application Serial No. 347,825, filed April 9, 1953.

The following examples, in which the parts given are by weight, are submitted to illustrate further and not to limit this invention.

Example I

Chlorine is bubbled into a nearly homogeneous solution of 37.5 parts of 1-methylcyclopentanol and 30 parts of sodium hydroxide in 700 parts of water over a period of two hours with stirring at ice/water bath temperatures, at such a rate that saturation is effected. The reaction mixture thus obtained separates into a lower yellow oil phase and an upper clear aqueous phase. The lower oil phase is extracted with three fifty-part portions of methylene chloride and the resultant extracts combined, washed with saturated aqueous sodium carbonate solution, and finally with water. The washed extract is then dried over anhydrous magnesium sulfate and the methylene chloride solvent removed at reduced pressure. There is thus obtained approximately a forty part yield of crude 1-methylcyclopentyl hypochlorite as a yellow oil exhibiting a strong active chlorine test with acidified potassium iodide solution and with alcoholic silver nitrate and possessing the characteristic odor of hypochlorite esters.

Example II

A forty part sample of crude 1-methylcyclopentyl hypochlorite is heated at 35–40° C. under a pressure of 80 mm. of mercury for ten minutes, during which time the material changes in color from yellow to green, with no evidence of exothermic reaction. The crude product so obtained is distilled at room temperature under a pressure of 2 mm. of mercury into a trap cooled in a solid carbon dioxide/acetone bath. There is thus obtained 35.5 parts (90% yield) of 6-chlorohexan-2-one as a colorless liquid boiling at 85–86° C. under a pressure of 16 mm. of mercury.

Additional samples of 1-methylcyclopentyl hypochlorite are also rearranged to 6-chlorohexan-2-one by treatment in solution in methanol or suspension in water with aqueous solutions of ferrous sulfate.

The preparation of a representative member of the new class of cyclic tertiary hypohalites of this invention (1-methylcyclopentyl hypochlorite) has been illustrated in Example I by the halogenation of the corresponding cyclic tertiary alcohol in an aqueous alkaline medium, specifically aqueous sodium hydroxide solution. Other such aqueous media can also be used including aqueous solutions of the alkali metal hydroxides and carbonates and aqueous suspensions of the alkaline earth metal hydroxides and carbonates. Other methods can also be used in the preparation of these new cyclic tertiary hypohalites; for instance they may be prepared in non-aqueous media such as ether, chloroform, carbon tetrachloride, etc., by reaction of the corresponding alcohol with chlorine monoxide, $Cl_2O$, or with a solution of anhydrous hypochlorous acid in those solvents.

As has been disclosed previously herein, the new cyclic tertiary hypohalites of this invention are those wherein each carbon carrying a hypohalite group is a tertiary carbon of whose valences at least two and preferably only two are together joined through one to two divalent organic radicals of from 3 to 7 aliphatic chain members, which can include hetero atoms such as oxygen, nitrogen, and sulfur to form an aliphatic ring or rings, and the remaining valence of the tertiary carbon, if any, is satisfied by an organic radical free of Zerewitinoff-active hydrogen and of less than seven carbons for each tertiary hypohalite radical in the molecule. Because of readier availability of the necessary intermediates and greater ease in preparation, the preferred cyclic tertiary hypohalites of this invention are those wherein the halogen is chlorine and the tertiary carbon carrying the hypochlorite radical has two of its valences together joined through a divalent hydrocarbon radical of 3 to 7, and preferably 4 to 5, aliphatic chain carbons, preferably a divalent saturated aliphatic hydrocarbon radical, to form an aliphatic ring and the remaining valence of the tertiary carbon is satisfied by a hydrocarbon radical of 1 to 6 carbons which is most preferably also free of aliphatic unsaturation.

Specific examples of the broad class of cyclic tertiary hypohalites of this invention include the tertiary cycloaliphatic hypochlorites and hypobromites, for example 1-methylcyclobutyl hypochlorite, 1-ethyl-4-methylcyclopentyl hypobromite, 1-phenyl-3-ethylcyclohexyl hypochlorite, 1-propylcycloheptyl hypochlorite, 1-phenyl-3(p-chlorophenyl)-cyclohexyl hypochlorite, 1,4-dimethyl-4-piperidyl hypochlorite, the hypochlorites of 3-ethyl-3-hydroxytetrahydrothiophene-1-dioxide and 3-methyl-3-hydroxytetrahydrofurane hypochlorite, 9-decahydronaphthyl hypochlorite, 1,2-ethylenebis(1-cyclopentyl hypochlorite).

These cyclic tertiary hypohalites can be prepared according to the procedure set forth in detail in Example I by substituting the requisite halogen, e. g., bromine, for the chlorine and for the 1-methylcyclopentanol therein employed the corresponding alcohols such as 1-methylcyclobutanol, 1-ethyl-4-methylcyclopentanol, 1-phenyl-3-ethylcyclohexanol, 1-propylcycloheptanol, 1-phenyl-3(p-chlorophenyl)-cyclohexanol, 1,4-dimethyl-4-piperidinol, 3-ethyl-3-hydroxytetrahydrothiophene-1-dioxide, 3-methyl-3-hydroxytetrahydrofurane, 9-hydroxy-decahydronaphthalene, and 1,2-ethylenebis(1-cyclopentanol).

As previously stated herein, these two cyclic tertiary hypohalites undergo ready rearrangement with no weight loss to an omega-halogen substituted ketone—the halogen, of course, being that of the hypohalite used. The halogen-substituted ketone products of this rearrangement will be of the same molecular weight as the starting hypohalite and will contain the halogen separated from the ketone carbon by the divalent organic radical which joins the two valences of the tertiary carbon of the starting cyclic tertiary hypohalite, with the remaining valence of the ketone carbon being satisfied by the same radical which satisfies the remaining valence of the tertiary carbon in the starting hypohalite. In those instances wherein all three valences of the tertiary carbon of the starting hypohalite are involved in a polycyclic structure, a mixture of products will be obtained varying with which one of the fused ring structures is broken in the rearrangement. In those instances wherein the starting cyclic tertiary hypohalite contains more than one such tertiary hypohalite group, the rearranged product will correspondingly contain the same number of halogen-substituted ketone moieties. Specific examples of the omega-halogen-substituted ketones obtained by this rearrangement include 5-bromopentan-2-one from 1-methylcyclobutyl hypobromite, phenyl 7-chloro-4-methyl-n-heptyl ketone from 1-phenyl-5-methylcyclooctyl hypochlorite, 2-(4-chlorobutyl) cyclohexanone and 6-chlorocyclodecanone from 9-decahydronaphthalene hypochlorite, 1,11-dichloro-5,7-undecanedione from methylenebis-1-cyclopentyl hypochlorite.

This rearrangement can be readily effected by maintaining the starting hypohalites at temperatures in the range 30° to 100° C. for periods of time ranging from 1 to 250 minutes. Longer periods of time, of course, may be used, but little or no advantage is gained thereby since the rearrangement is essentially complete in this temperature range in most cases in as short a time as 5 to 30 minutes. Higher temperatures can, of course, also be used in the rearrangement, but again little advantage is gained thereby and the tendency for some of the cyclic tertiary hypohalites to undergo the rearrangement reaction with extreme rapidity in the higher temperature ranges, e. g., of the order of 100° to 150° C., prompts the use of temperatures in the range 40° to 60° C.

The rearrangement reaction can be carried out in bulk or in solution in a normally liquid unreactive solvent, e. g., the halogenated hydrocarbons such as chloroform, carbon tetrachloride, methylene chloride, chlorobenzene; the aromatic hydrocarbons, e. g., benzene, toluene, and the xylenes. The rearrangement can also be carried out in aqueous systems, i. e., two-phase or heterogeneous systems, since the starting cyclic tertiary hypohalites are generally water-insoluble. Thus, if desired, the crude reaction mixture obtained in the normally used preparative method of the starting tertiary cyclic hypohalite (i. e., the halogenation of the requisite cyclic tertiary alcohol in an aqueous alkaline medium) can be placed directly under conditions necessary for the rearrangement and the rearranged product, i. e., the omega-halogen-substituted ketone isolated directly by normal procedures of distillation or extraction and subsequent distillation, or, in the case of solids, filtration. However, because of the greater purity normally obtained in the rearranged product, i. e., the omega-halogen-substituted ketone, it is preferred to isolate the starting cyclic tertiary hypohalite from the reaction mixture and to carry out the rearrangement either in bulk or in organic solution.

The rearrangement can be carried out at lower temperatures and in shorter times through the use of suitable catalysts, e. g., ultraviolet light or sunlight. Thus, the rearrangement can be carried out at room temperature in as short a time as 15 minutes by irradiation of the starting cyclic tertiary hypohalite with ultraviolet light, in bulk, or in solution.

This rearrangement reaction is quite surprising in that no molecule of organic halide is split out, nor is any cyclic ketone formed. As has been disclosed in detail previously, rearrangement, not degradation, surprisingly occurs producing only an omega-haloketone.

This new class of cyclic tertiary hypohalites, in addition to their utility in undergoing this surprising rearrangement to produce the desirable omega-halogen-substituted ketones, are also useful as bleaches, as chlorinating agents, as reagents for preparation of halohydrins, and generally as sources of active halogen.

The omega-halogen-substituted ketones resulting from the surprising rearrangement of the new cyclic tertiary hypohalites of this invention are in themselves useful as otherwise difficultly obtainable intermediates for organic syntheses and as compounds of biological interest for their pesticidal and fungicidal properties.

As many apparently widely different embodiments of this invention may be made without departing from the spirit and scope thereof, it is to be understood that this invention is not limited to the specific embodiments thereof except as defined in the appended claims.

I claim:

1. A tertiary cycloaliphatic hypohalite in which a tertiary carbon atom in a cycloaliphatic ring is bonded directly to a hypohalite radical selected from the class consisting of hypochlorite and hypobromite radicals.

2. A tertiary cycloaliphatic hypochlorite in which a tertiary carbon atom in a cycloaliphatic ring is bonder directly to a hypochlorite radical.

3. A cyclic tertiary hypohalite in which a tertiary carbon atom is bonded directly to a hypohalite radical selected from the class consisting of hypochlorite and hypobromite radicals and at least two of the valences of said tertiary carbon atom are joined together through at least one divalent organic radical of from 3 to 7 aliphatic chain members to form an aliphatic ring, any remaining valence of said tertiary carbon atom being satisfied by an organic radical free of Zerewitinoff-active hydrogen and of from 1 to 6 chain members per hypohalite radical in the molecule.

4. A cyclic tertiary hypohalite in which a tertiary carbon atom is bonded directly to a hypohalite radical selected from the class consisting of hypochlorite and hypobromite radicals and two to three of the valences of said tertiary carbon atom are joined together through, respectively, one to two divalent hydrocarbon radicals of from 3 to 7 aliphatic carbon atoms to form an aliphatic ring, any remaining valence of said tertiary carbon atom being satisfied by a hydrocarbon radical free of Zerewitinoff-active hydrogen and of from 1 to 6 carbon atoms.

5. A cyclic tertiary hypochlorite in which a tertiary carbon atom is bonded directly to a hypochlorite radical and two to three of the valences of said tertiary carbon atom are joined together through, respectively, one to two divalent hydrocarbon radicals of from 3 to 7 aliphatic carbon atoms to form an aliphatic ring, any remaining valence of said tertiary carbon atom being satisfied by a hydrocarbon radical free of Zerewitinoff-active hydrogen and of from 1 to 6 carbon atoms.

6. A cyclic tertiary hypochlorite in which a tertiary carbon atom is bonded directly to a hypochlorite radical and two of the valences of said tertiary carbon atom are joined together through a divalent organic radical of from 3 to 7 aliphatic chain members to form an aliphatic ring, the remaining valence of said tertiary carbon atom being satisfied by an organic radical free of Zerewitinoff-active hydrogen and of from 1 to 6 chain members.

7. A cyclic tertiary hypochlorite in which a tertiary carbon atom is bonded directly to a hypochlorite radical and two of the valences of said tertiary carbon atom are joined together through a divalent hydrocarbon radical of from 3 to 7 aliphatic carbon atoms to form an aliphatic ring, the remaining valence of said tertiary carbon atom being satisfied by a hydrocarbon radical free of Zerewitinoff-active hydrogen and of from 1 to 6 carbon atoms.

8. A cyclic tertiary hypochlorite in which a tertiary carbon atom is bonded directly to a hypochlorite radical and two of the valences of said tertiary carbon atom are joined together through a divalent saturated aliphatic hydrocarbon radical of from 3 to 7 aliphatic carbon atoms to form an aliphatic ring, the remaining valence of said tertiary carbon atom being satisfied by an alkyl radical of 1 to 6 carbon atoms.

9. The chemical compound 1-methylcyclopentyl hypochlorite.

References Cited in the file of this patent

UNITED STATES PATENTS

| Number | Name | Date |
|---|---|---|
| 1,938,175 | Deanesly | Dec. 5, 1933 |
| 2,132,342 | Jackson | Oct. 4, 1938 |
| 2,132,345 | Reichert et al. | Oct. 4, 1938 |
| 2,194,703 | Kroeger | Mar. 26, 1940 |
| 2,370,392 | Boon | Feb. 27, 1945 |